United States Patent
Porte et al.

(10) Patent No.: US 11,815,046 B2
(45) Date of Patent: Nov. 14, 2023

(54) TURBOFAN ENGINE COMPRISING A SYSTEM FOR BLOCKING THE FLOW PATH OF THE BYPASS STREAM COMPRISING VEILS

(71) Applicant: Airbus Operations SAS, Toulouse (FR)

(72) Inventors: Alain Porte, Toulouse (FR); Lionel Czapla, Toulouse (FR); Benjamin Thubert, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 61 days.

(21) Appl. No.: 17/580,110

(22) Filed: Jan. 20, 2022

(65) Prior Publication Data

US 2022/0228541 A1 Jul. 21, 2022

(51) Int. Cl.
*F02K 1/72* (2006.01)
*F02K 1/64* (2006.01)

(52) U.S. Cl.
CPC ............... *F02K 1/72* (2013.01); *F02K 1/645* (2013.01)

(58) Field of Classification Search
CPC .................................. F02K 1/645; F02K 1/72
See application file for complete search history.

(56) References Cited

U.S. PATENT DOCUMENTS 2,833,890 A    4/1960  Jacobs, Jr.
3,330,115 A *  7/1967  Markowski ............... F02K 1/68
                                                       244/113
4,638,946 A *  1/1987  Hall ......................... F02K 1/006
                                                       239/265.33
2020/0347800 A1  11/2020  Gonidec et al.

FOREIGN PATENT DOCUMENTS

FR    3076864 A1     7/2019
FR    3077847 B2 *   2/2020  ............ F02K 1/645
FR    3087848 A1     5/2020

OTHER PUBLICATIONS

French Search Report; priority document.

* cited by examiner

*Primary Examiner* — Ted Kim
(74) *Attorney, Agent, or Firm* — Greer, Burns & Crain, Ltd.

(57) ABSTRACT

A turbofan engine with a nacelle and a flow path, in which the nacelle comprises a movable cowl that makes it possible to define a window between the flow path and the outside, veils with a first edge fixed to the movable cowl and alternately assuming a folded position or a deployed position across the flow path, and a pneumatic system displacing a second edge of the veils from the folded position to the deployed position and vice versa. The pneumatic system comprises a rigid main roll, for each veil, at least one extendable secondary roll fixed to a second edge of the veil, and a pressurization and depressurization system which, alternately, generates a pressure or a depression in each secondary roll. Replacing the reverse doors and their driving mechanisms with flexible veils and a pneumatic system allows for a weight reduction.

10 Claims, 5 Drawing Sheets

TURBOFAN ENGINE COMPRISING A SYSTEM FOR BLOCKING THE FLOW PATH OF THE BYPASS STREAM COMPRISING VEILS

CROSS-REFERENCES TO RELATED APPLICATIONS

This application claims the benefit of the French patent application No. 2100620 filed on Jan. 22, 2021, the entire disclosures of which are incorporated herein by way of reference.

FIELD OF THE INVENTION

The present invention relates to a turbofan engine which comprises flexible veils and a pneumatic deployment system which deploys the veils to block the flow path of the bypass stream and which folds the veils to free the flow path of the bypass stream, and an aircraft comprising at least one such turbofan engine.

BACKGROUND OF THE INVENTION

An aircraft comprises a fuselage, on each side of which there is fixed a wing. Under each wing there is suspended at least one turbofan engine. Each turbofan engine is fixed under the wing via a pylon which is fixed between the structure of the wing and the structure of the turbofan engine.

The turbofan engine comprises an engine and a nacelle which is fixed around the engine. The turbofan engine has, between the nacelle and the engine, a bypass flow path in which a bypass stream circulates.

The nacelle comprises a plurality of reversing doors, each being rotationally movable on the structure of the nacelle between a rearward position in which it is outside of the bypass flow path and a deployed position in which it is positioned across the bypass flow path in order to deflect the bypass stream to a window which is in the wall of the nacelle and which is opened between the bypass flow path and the outside of the nacelle.

Thus, the bypass stream is deflected outwards and, more specifically, towards the front of the turbofan engine in order to produce a counter-thrust.

Although the reversing doors give full satisfaction, it is desirable to find different mechanisms, in particular less heavy mechanisms.

SUMMARY OF THE INVENTION

One object of the present invention is to propose a turbofan engine which comprises flexible veils and a pneumatic system which deploys the veils to block the flow path of the secondary stream and which folds the veils to free the flow path of the secondary stream.

To this end, a turbofan engine is proposed that has a longitudinal direction and that comprises an engine and a nacelle surrounding the engine which comprises a fan casing, in which a flow path of a secondary stream is delimited between the nacelle and the engine and in which an air stream circulates from the front to the rear of the turbofan engine, the nacelle comprising:
a fixed structure fixed to the fan casing,
a movable cowl which is movable in translation on the fixed structure in a direction of translation between an forward position in which the movable cowl is positioned in such a way that it is close to the fan casing and a rearward position in which the movable cowl is positioned in such a way that it is away from the fan casing to define between them an open window between the flow path and the outside of the nacelle,
a set of actuators ensuring the displacement of the movable cowl between the forward position and the rearward position, and vice versa,
a plurality of flexible veils, having a first edge fixed to the movable cowl and a second edge opposite the first edge, in which the veil can alternately assume a folded position in which the veil is housed in the movable cowl or a deployed position in which the veil is extended between the first edge and the engine across the flow path, and
a pneumatic system arranged to displace the second edge of each veil in order to displace the veil from the folded position to the deployed position and to displace the second edge of each veil in order to displace the veil from the deployed position to the folded position, in which the pneumatic system comprises:
a rigid main roll fixed inside the movable cowl to the rear of the window,
for each veil, at least one extendable secondary roll secured to the main roll and in which the inside of each secondary roll is in fluidic continuity with the inside of the main roll, in which the second edge of the veil is fixed to each of the secondary rolls, and
a pressurization and depressurization system which, alternately, generates a pressure in the main roll and therefore in each secondary roll to inflate them in the transition from the forward position to the rearward position, or generates a depression in the main roll and therefore in each secondary roll to deflate them in the transition from the rearward position to the forward position.

Replacing the reversing doors and their driving mechanisms with flexible veils and a pneumatic system allows for a weight reduction.

Advantageously, the pressurization and depressurization system comprises:
a Venturi-effect tube with an inlet section, an outlet section and an intermediate section between the inlet section and the outlet section, in which the inlet section is fluidically connected to an air take-off point in the flow path,
a bypass line of which an inlet is fluidically connected to the inlet section and of which an outlet is fluidically connected to the intermediate section,
a terminal line of which an inlet is fluidically connected to the bypass line and of which an outlet is fluidically connected to the main roll,
a first valve disposed at the inlet of the bypass line and which can alternately assume an open position allowing the passage between the inlet section and the bypass line or a closed position preventing the passage between the inlet section and the bypass line,
a second valve disposed at the inlet of the terminal line and which can alternately assume a first position allowing the passage between the bypass line and the terminal line from the inlet of the bypass line and preventing the passage between the terminal line and the bypass line to the outlet of the bypass line, and a second position allowing the passage between the terminal line and the bypass line to the output of the bypass line and preventing the passage between the bypass line and the terminal line from the inlet of the bypass line, and a third valve disposed at the outlet of the bypass line and which can alternately assume an open position allowing the passage between the bypass line and the outlet section or a closed position preventing the passage between the bypass line and the outlet section.

Advantageously, the turbofan engine comprises:

for each veil, a roller mounted to rotate freely on the movable cowl behind the window when the movable cowl is in rearward position, in which the first edge of the veil is fixed to the roller, in which, in folded position, the veil is wound around the roller or, in deployed position, the veil is unwound from the roller, a deployment mechanism arranged to displace the second edge of each veil in order to displace the veil from the folded position to the deployed position, and a folding mechanism arranged to drive each roller in rotation in order to displace the veil associated with the roller from the deployed position to the folded position.

Advantageously, the deployment mechanism comprises:

for each second edge, a plate secured to the second edge, for each plate, at least one pulling pulley mounted to rotate freely on the plate, a cable which passes through each pulling pulley, and for each end of the cable, a declutchable displacement system which ensures the pulling of the end.

Advantageously, there is a pulling pulley at each end of the plate.

Advantageously, each displacement system comprises a set of guiding pulleys and an electric winder on which the cable is wound.

According to a particular embodiment, the folding mechanism comprises, for each roller, a deflection pulley fixed coaxially to the roller, a winding pulley fixed to the fixed structure, a winding cable, of which one end is fixed to the fixed structure and of which the other end is fixed to the winding pulley and in which the winding cable passes through the deflection pulley, a nitrogen damper of which a cylinder is fixed to the fixed structure and of which a piston slides in the cylinder, and a transformation system which ensures the transformation of the rotational movement of the winding pulley into a translational movement of the piston and vice versa.

According to a particular embodiment, the folding mechanism comprises, for each roller, a deflection pulley fixed coaxially to the roller, a winding pulley, a winding cable, of which one end is fixed to the fixed structure and of which the other end is fixed to the winding pulley and in which the winding cable passes through the deflection pulley, and a declutchable electric winder to which the winding pulley is fixed.

The invention also proposes an aircraft comprising at least one turbofan engine according to one of the preceding variants.

BRIEF DESCRIPTION OF THE DRAWINGS

The features of the invention mentioned above, and others, will become more clearly apparent on reading the following description of an exemplary embodiment, the description being given in relation to the attached drawings, in which.

DETAILED DESCRIPTION OF THE PREFERRED EMBODIMENTS

Figure 1:
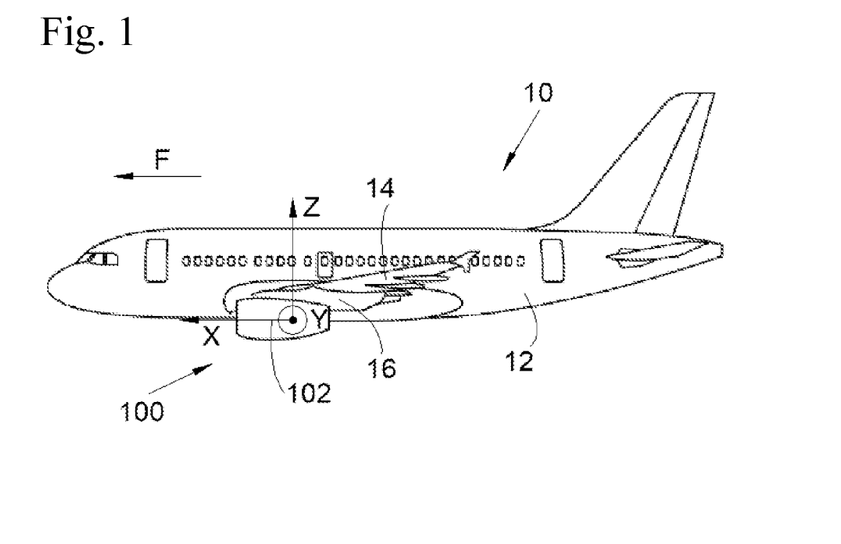
FIG. 1 is a side view of an aircraft comprising a turbofan engine according to the invention.

In the following description, the terms relating to a position are taken with reference to the direction of advance of an aircraft as represented in FIG. 1 by the arrow F.

FIG. 1 shows an aircraft 10 which comprises a fuselage 12, on each side of which is fixed a wing 14 which bears at least one turbofan engine 100 according to the invention. The turbofan engine 100 is fixed under the wing 14 via a pylon 16.

Figure 3:
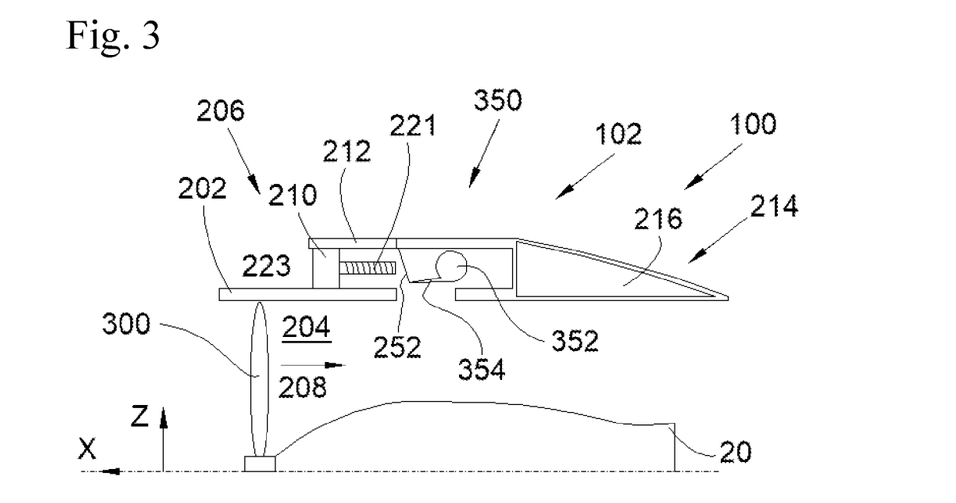
FIG. 3 is a schematic representation of a turbofan engine according to the invention seen in cross section through a radial plane and in forward and folded position.
Figure 4:
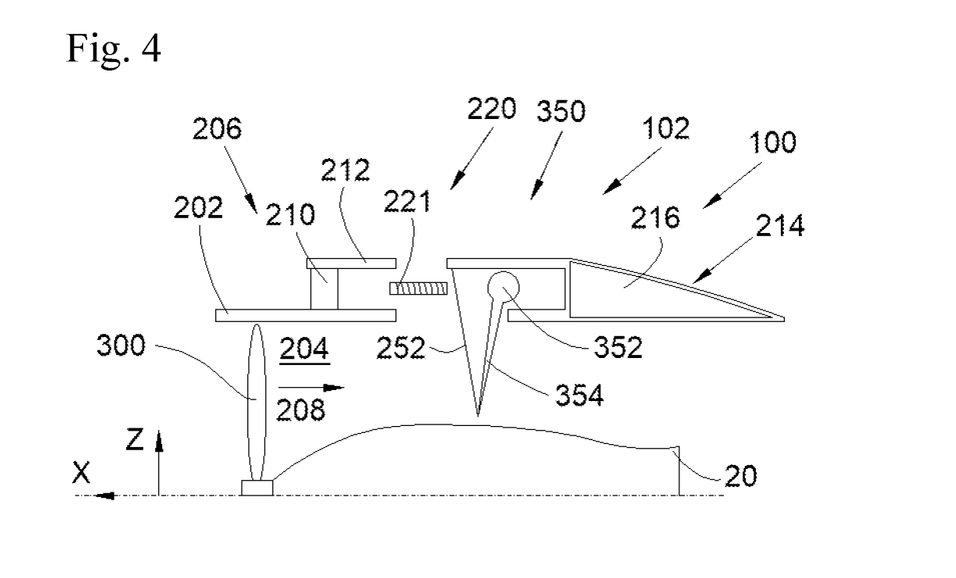
FIG. 4 is a schematic representation of a turbofan engine according to the invention seen in cross section through a radial plane and in rearward and deployed position.

FIG. 3 and FIG. 4 show the turbofan engine 100 which has a nacelle 102 and an engine 20 which is housed inside the nacelle 102. The turbofan engine 100 also comprises a fan casing 202.

In the following description, and by convention, X denotes the longitudinal direction of the turbofan engine 100 which is parallel to the longitudinal axis of the aircraft 10 oriented positively to the front of the aircraft 10, Y denotes the transverse direction which is horizontal when the aircraft is on the ground, and Z denotes the vertical direction, these three directions X, Y and Z being orthogonal to one another.

The turbofan engine 100 has, between the nacelle 102 and the engine 20, a flow path 204 in which circulates a bypass stream 208 coming from the air intake through a fan 300 and which therefore flows in the direction of flow which goes from front to rear of the turbofan engine 100.

The nacelle 102 has a fixed structure 206 which is fixedly mounted on the fan casing 202. The fixed structure 206 is composed, in particular here, of a front frame 210 mounted around the fan casing 202 and of outer panels 212 fixed to the front frame 210 and forming an outer aerodynamic surface.

The nacelle 102 has a movable assembly 214 which has a movable cowl 216 which, here, forms the outer walls of the jet nozzle.

The nacelle 102 also has cascades 221 which are secured to the movable assembly 214.

The movable cowl 216 is mounted to be movable in translation in a direction of translation that is overall parallel to the longitudinal direction X on the fixed structure 206 of the nacelle 102.

The movable cowl 216 is movable between an forward position (FIG. 3) and a rearward position (FIG. 4) and vice versa. In forward position, the movable cowl 216 is positioned as far forward as possible with respect to the direction of advance so that the movable cowl 216 is close to the outer panels 212 and the fan casing 202 and thus forms a continuous aerodynamic surface. In rearward position, the movable cowl 216 is positioned as far back as possible with respect to the direction of advance so that the movable cowl 216 is away from the outer panels 212 and the fan casing 202 so as to define between them a window 220 which opens between the flow path 204 and the outside and where the cascades 221 are positioned.

In forward position, the movable cowl 216 and the outer panels 212 extend one another so as to define the outer surface of the nacelle 102, and the movable cowl 216 and the fan casing 202 extend one another so as to define the outer surface of the flow path 204. In forward position, the cascades 221 are accommodated between the outer panels 212 and the fan casing 202.

In rearward position, the movable cowl 216 and the fan casing 202 and the outer panels 212 are at a distance and define between them the open window 220 between the flow path 204 and the outside of the nacelle 102. That is to say, the air of the bypass stream 208 passes through the window 220 to go back outside the turbofan engine 100 by passing through the cascades 221.

The translation of the movable cowl 216 is performed by any appropriate means such as, for example, systems of runners between the beams of the fixed structure 206 and the movable cowl 216.

The nacelle 102 also comprises a set of actuators (not represented) ensuring the translational displacement of the movable cowl 216 between the forward position and the rearward position and vice versa. Each actuator is controlled by a control unit, for example of processor type, which controls the displacements in one direction or the other depending on the needs of the aircraft 10.

Each actuator can, for example, take the form of a dual-acting cylinder (two working directions) of which the cylinder is fixed to the fixed structure 206 and a rod is fixed to the movable cowl 216.

The fan casing 202 and the outer panels 212 delimit the window 220 upstream with respect to the direction of flow and the movable cowl 216 delimits the window 220 downstream with respect to the direction of flow.

Figure 2:
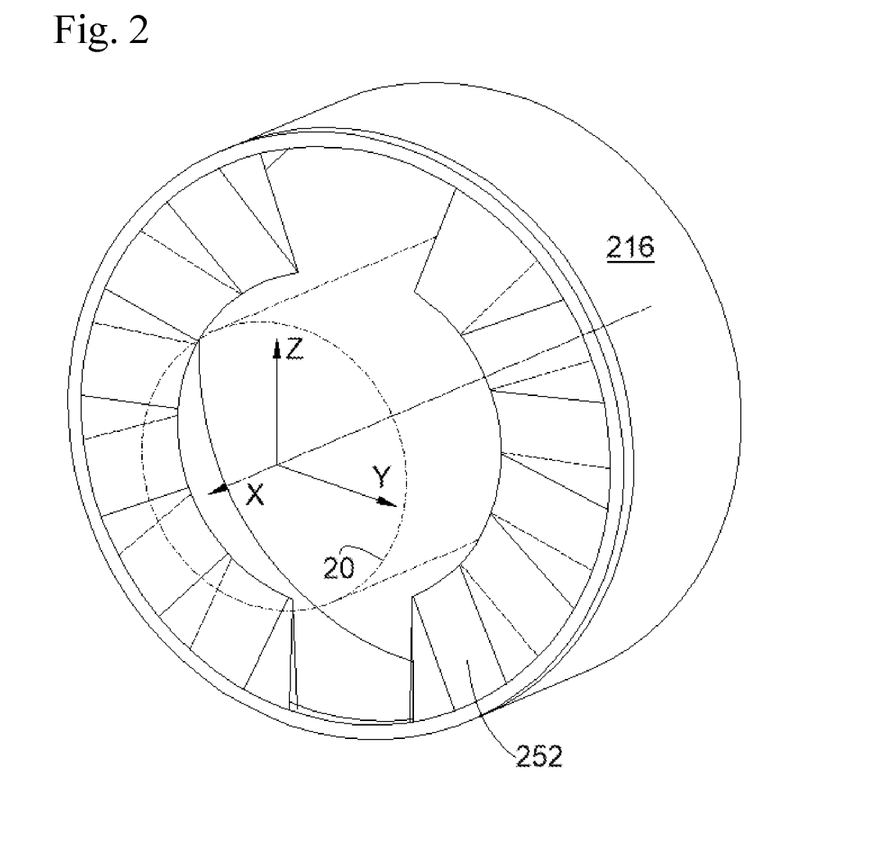
FIG. 2 is a perspective view of the turbofan engine according to the invention in the deployed position of the veils.

FIG. 2 shows the movable cowl 216 and the engine 20 which is represented here by a chain-dotted line cylinder.

The nacelle 102 comprises a plurality of veils 252 in which each is flexible and here overall takes the form of a trapezoid. Each veil 252 can alternately take a folded position (FIG. 3) or a deployed position (FIGS. 2 and 4). Each veil 252 has a fixed first edge and a movable second edge opposite the first edge. Each first edge is fixed to the movable cowl 216, inside the movable cowl 216, outside of the flow path 204 and behind the window 220 when the movable cowl 216 is in rearward position.

In folded position, each veil 252 is housed in the movable cowl 216 and in deployed position, the veil 252 is extended between the first edge and the second edge which extends close to the engine 20 across the flow path 204 in order to block it. Thus, the second edge is away from the first edge in the deployed position and close to the first edge in folded position.

Here, each first edge is inscribed in a plane at right angles to the longitudinal direction X and is at right angles to the radial direction with respect to the longitudinal direction X and passing through the middle of the first edge.

The nacelle 102 also comprises a pneumatic system 350 which is arranged to displace the second edge of each veil 252 in order to displace the veil 252 from the folded position to the deployed position and to displace the second edge of each veil 252 in order to displace the veil 252 from the deployed position to the folded position.

The pneumatic system 350 is synchronized with the displacement of the movable cowl 216 for the transition from the folded position to the deployed position to correspond to the transition from the forward position to the rearward position, and for the transition from the deployed position to the folded position to correspond to the transition from the rearward position to the forward position.

In deployed position, the veils 252 are positioned behind the window 220 to form a barrier in the flow path 204 to deflect the bypass stream 208 coming from the front towards the window 220. In deployed position, the second edge of each veil 252 comes around the engine 20.

The operation therefore comprises, from the forward/folded position, ordering the activation of the actuators to displace the movable cowl 216 from the forward position to the rearward position, which drives the displacement of the cascades 221 facing the window 220.

During this displacement, the pneumatic system 350 deploys each veil 252 across the flow path 204.

In reverse, the operation thus comprises, from the rearward/deployed position, in ordering the activation of the actuators to displace the movable cowl 216 from the rearward position to the forward position, which drives the displacement of the cascades 221 to their initial position.

During this displacement, the pneumatic system 350 folds each veil 252 onto the outside of the flow path 204.

The use of several flexible veils 252 allows the assembly to be lightened compared to the use of reversing doors from the state of the art. Furthermore, the veils 252 make it possible to adjust the efficiency and the aeramatch which characterize a thrust reverser. The term "aeramatch" here denotes the ratio between the outlet section of the nozzle in direct jet mode and the outlet section of the jet nozzle in thrust-reversing mode.

The pneumatic system 350 comprises a main roll 352 fixed inside the movable cowl 216 to the rear of the window 220 and that overall takes the form of a torus around the longitudinal direction X and, for each veil 252, at least one secondary roll 354 which is secured to the main roll 352 and in which the inside of each secondary roll 354 is in fluidic continuity with the inside of the main roll 352. The material constituting the main roll 352 is rigid, for example metal, and the material constituting the secondary rolls 354 is highly extendible, for example made of rubber.

Each secondary roll 354, for example, takes the form of a pipe of which a first end is fixed to the main roll 352 and of which a second end is free and plugged. Each secondary roll 354, for example, takes the form of a pipe of which the two ends are fixed to the main roll 352 thus forming a loop.

For each secondary roll 354 associated with a veil 252, the second edge of the veil 252 is fixed to each secondary roll 354, either at the free second end, or in the middle of the pipe depending on the type of secondary roll 354. In any case, the second edge is fixed to the secondary roll 354 so that when the secondary roll 354 is inflated, the second edge is positioned around the engine 20. The greater the number of secondary rolls 354 for a veil 252, the better will be the tension of the second edge in deployed position.

The pneumatic system 350 comprises a pressurization and depressurization system which, alternately, generates a pressure in the main roll 352 and, therefore, in each secondary roll 354 to inflate them, or generates a depression in the main roll 352 and, therefore, in each secondary roll 354 to deflate them. The pressurization and depressurization system is controlled by the control unit according to requirements.

Thus, upon the transition from the forward/folded position to the rearward/deployed position, the control unit controls the pressurization and depressurization system to make it generate a pressure and inflate the secondary rolls 354 and thus deploy the veils 252, and, upon the transition from the rearward/deployed position to the forward/folded position, the control unit controls the pressurization and depressurization system to make it generate a depression and deflate the secondary rolls 354 and thus fold back the veils 252.

The pressurization and depressurization system can, for example, be a fan controlled by the control unit and that can alternately generate a pressure or a depression in the main roll 352.

Figure 5:
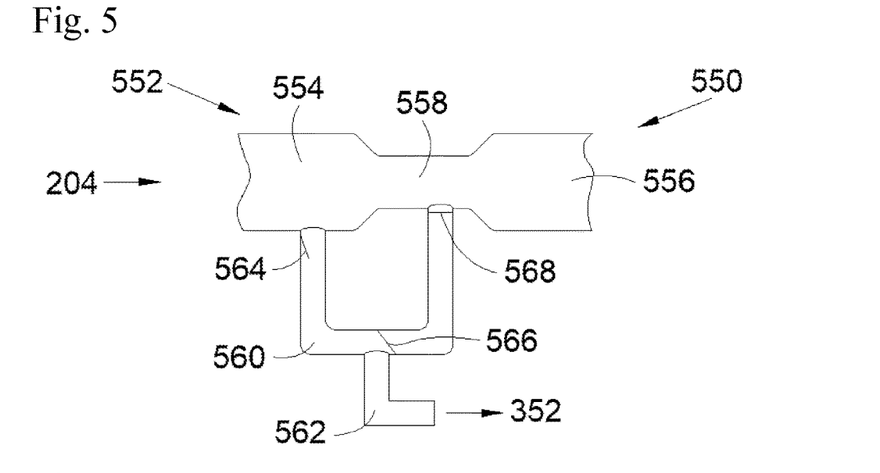
FIG. 5 is a representation of a pressurization and depressurization system in a pressurization position implemented in the context of the invention.
Figure 6:
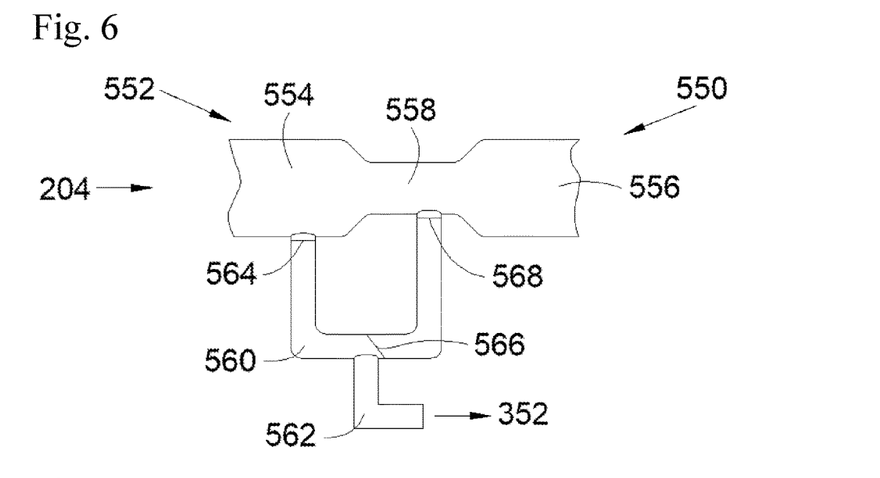
FIG. 6 shows the pressurization and depressurization system of FIG. 5 in pressure-maintaining position.
Figure 7:
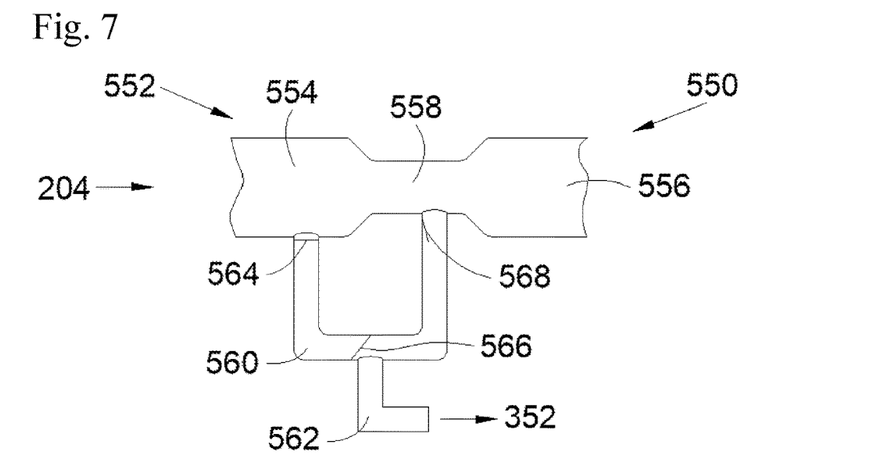
FIG. 7 shows the pressurization and depressurization system of FIG. 5 in depressurization position.

FIGS. 5 to 7 show a particular pressurization and depressurization system 550. The particular pressurization and depressurization system 550 comprises a Venturi-effect tube 552 which has an inlet section 554, an outlet section 556 and an intermediate section 558 between the inlet section 554 and the outlet section 556, in which the diameter of the intermediate section 558 is less than the diameters of the inlet 554 and outlet 556 sections.

The inlet section 554 is fluidically connected to a point for taking of hot air from the flow path 204 and the outlet section 556 is fluidically connected, for example, to a heating system of the cabin of the aircraft 10.

The particular pressurization and depressurization system 550 also comprises a bypass line 560 of which an inlet is fluidically connected to the inlet section 554 and of which an outlet is fluidically connected to the intermediate section 558.

The particular pressurization and depressurization system 550 comprises a terminal line 562 of which an inlet is fluidically connected to the bypass line 560 and of which an outlet is fluidically connected to the main roll 352.

The particular pressurization and depressurization system 550 also comprises:
- a first valve 564 disposed at the inlet of the bypass line 560 and which can alternately take an open position allowing the passage between the inlet section 554 and the bypass line 560 or a closed position preventing the passage between the inlet section 554 and the bypass line 560,
- a second valve 566 disposed at the inlet of the terminal line 562 and which can alternately take a first position allowing the passage between the bypass line 560 and the terminal line 562 from the inlet of the bypass line 560 and preventing the passage between the terminal line 562 and the bypass line 560 to the outlet of the bypass line 560, and a second position allowing the passage between the terminal line 562 and the bypass line 560 to the outlet of the bypass line 560 and preventing the passage between the bypass line 560 and the terminal line 562 from the inlet of the bypass line 560, and
- a third valve 568 disposed at the outlet of the bypass line 560 and which can alternately take an open position allowing the passage between the bypass line 560 and the outlet section 556 or a closed position preventing the passage between the bypass line 560 and the outlet section 556.

Each valve 564, 566, 568 is position-controlled by the control unit.

FIG. 5 corresponds to the inflation of the secondary rolls 354. The first valve 564 is in open position, the second valve 566 is in the first position, and the third valve 568 is in closed position. The air coming from the flow path 204 is then directed into the main roll 352 and into each secondary roll 354 to inflate them, and each veil 252 is brought into deployed position.

FIG. 6 corresponds to a position keeping the secondary rolls 354 in the inflated state. The first valve 564 is in closed position, the second valve 566 is in the first position or in the second position, and the third valve 568 is in closed position. The air which is in the main roll 352 and in each secondary roll 354 is then blocked.

FIG. 7 corresponds to the deflation of the secondary rolls 354. The first valve 564 is in closed position, the second valve 566 is in the second position, and the third valve 568 is in open position. The air of the main roll 352 and of each secondary roll 354 is sucked by the Venturi effect into the intermediate section 558 and each secondary roll 354 is deflated and each veil 252 is returned to folded position.

Figure 8:
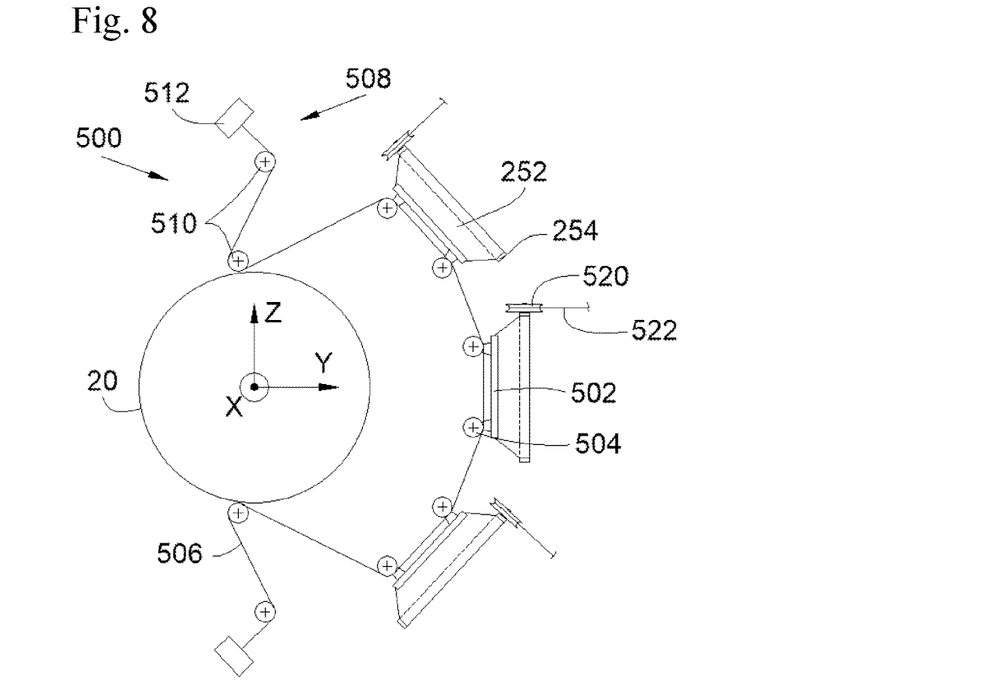
FIG. 8 is a schematic and front-view representation of a deployment mechanism in folded position.
Figure 9:
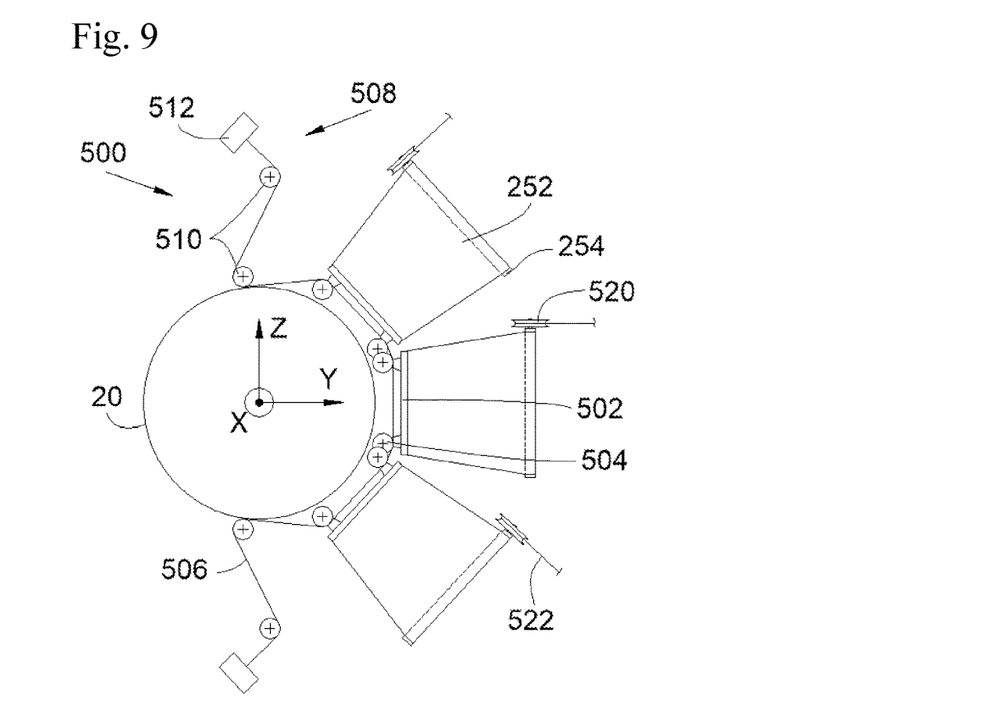
FIG. 9 is a schematic and front-view representation of the deployment mechanism in deployed position.

In the embodiment of FIGS. 8 and 9, the direct fixing of the first edge of each veil 252 to the movable cowl 216 is replaced by an indirect fixing through rollers 254. This embodiment makes it possible to improve the deployment and the folding of the veils 252 by assisting the pneumatic system 350.

The nacelle 102 thus comprises, for each veil 252, a roller 254 mounted to rotate freely on the movable cowl 216. Each roller 254 is mounted inside the movable cowl 216, outside the flow path 204 and behind the window 220 when the movable cowl 216 is in rearward position. The rollers 254 are distributed angularly around the longitudinal direction X along the perimeter of the movable cowl 216.

In folded position, each veil 252 is wound around the associated roller 254. Thus, in folded position, the veil 252 is wound around the roller 254 and in deployed position, the veil 252 is unwound from the roller 254 and extended between the roller 254 and the engine 20 across the flow path 204 in order to block it. The first edge of each veil 252 is thus fixed to the associated roller 254 and the second edge is away from the roller 254 in the deployed position and close to the roller 254 in folded position.

Here, the axis of rotation of each roller 254 is inscribed in a plane at right angles to the longitudinal direction X and is at right angles to the radial direction with respect to the longitudinal direction X and passing through the middle of the roller 254.

The nacelle 102 also comprises a deployment mechanism which is arranged to displace the second edge of each veil 252 in order to displace the veil 252 from the folded position to the deployed position and a folding mechanism which is arranged to drive each roller 254 in rotation in order to displace the veil 252 associated with the roller 254 from the deployed position to the folded position.

As previously, the deployment and folding mechanisms are synchronized with the displacement of the movable cowl 216 for the transition from the folded position to the deployed position to correspond to the transition from the forward position to the rearward position, and for the transition from the deployed position to the folded position correspond to the transition from the rearward position to the forward position.

During the displacement from the forward/folded position to the rearward/deployed position, the deployment mechanism assists in the deployment of each veil 252 across the flow path 204.

In reverse, during the displacement from the rearward/deployed position to the forward/folded position, the folding mechanism folds each veil 252 on the outside of the flow path 204.

FIGS. 8 and 9 show a deployment mechanism 500 according to a particular embodiment. In these FIGS. 8 and 9, only three veils 252 are represented for ease of understanding, but the other veils 252 are disposed angularly around the longitudinal direction X.

For each veil 252, the deployment mechanism 500 comprises a plate 502 secured to the second edge of the veil 252 and which ensures the rigidity of the second edge. Each secondary roll 354 associated with the veil 252 can be fixed to this plate 502.

Each plate 502 bears at least one pulling pulley 504 mounted to rotate freely on the plate 502. Here, for reasons of balance, the plate 502 bears a pulling pulley 504 at each end of the plate 502, that is to say, at each end of the second edge.

For several veils 252, the deployment mechanism 500 also comprises a cable 506 which passes through each pulling pulley 504 of the several veils 252. In the embodiment of the invention presented in FIGS. 8 and 9, there are two cables 506, one for the port veils 252 (not represented) and one for the starboard veils 252. Obviously, a different distribution is possible.

For each end of the cable 506, the deployment mechanism 500 comprises a displacement system 508 which ensures the pulling of the end. Thus, a pull on each end of the cable 506 will tauten the cable 506 and deploy each veil 252 by displacement of the associated plate 502 under the effect of the cable 506.

Each displacement system 508 here comprises a set of guiding pulleys 510 and an electric winder 512 onto which the cable 506 is wound.

The folding mechanism comprises a mechanism which ensures the rotation of each roller 254 in the direction of winding of the veil 252 on the roller 254.

When the folding mechanism is activated, the deployment mechanism must be declutched so as not to generate any force retaining the veil 252. In the case of FIGS. 8 and 9, each displacement system 508, and more particularly each electric winder 512, must be declutched to turn freely.

Figure 10:
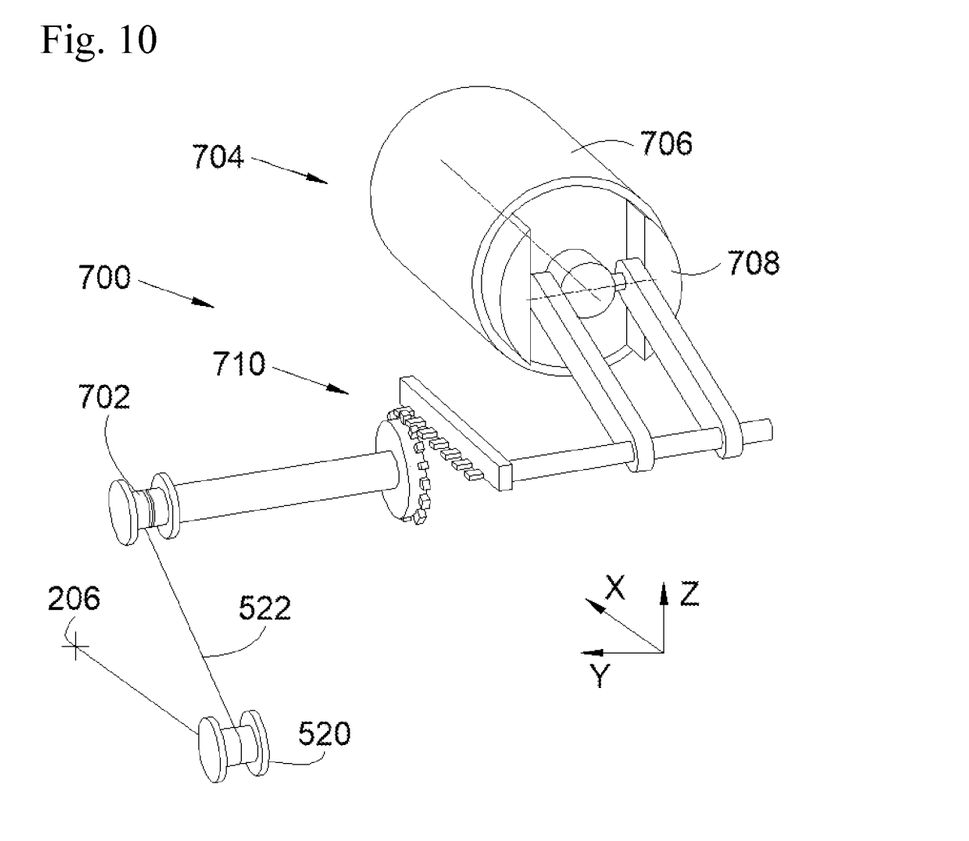
FIG. 10 is a perspective view of a folding mechanism.

FIG. 10 shows a folding mechanism 700 according to a particular embodiment.

For each roller 254, the folding mechanism 700 comprises a deflection pulley 520 fixed coaxially to the roller 254, a winding pulley 702 fixed to the fixed structure 206 and a winding cable 522, of which one end is fixed to the fixed structure 206 and of which the other end is fixed to the winding pulley 702 and in which the winding cable 522 passes through the deflection pulley 520.

For each roller 254, the folding mechanism 700 comprises a nitrogen damper 704 which comprises a cylinder 706 fixed to the fixed structure 206 and a piston 708 sliding in the cylinder 706.

For each roller 254, the folding mechanism 700 also comprises a transformation system 710 which ensures the transformation of the rotational movement of the winding pulley 702 into a translational movement of the piston 708 and vice versa.

The transformation system 710 here takes the form of a rack and pinion system.

From the forward position, the movable assembly 214 retracts, which tends to displace the deflection pulley 520 towards the rear and therefore to unwind the winding cable 522 from the winding pulley 702.

Through action of the transformation system 710, the rotation of the winding pulley 702 causes the piston 708 to be driven into the cylinder 706 and therefore results in a compression of the nitrogen present in the nitrogen damper 704.

In reverse, from the rearward position, when the movable assembly 214 advances, the winding cable 522 slackens and the pressure of the nitrogen against the piston 708 pushes the latter back, and, through action of the transformation system 710, the translational displacement of the piston 708 drives the rotation of the winding pulley 702 which winds the winding cable 522 and thereby drives the rotation of the deflection pulley 520 which, in turn, drives the roller 254 and therefore the winding of the veil 252.

According to another embodiment, the folding mechanism can comprise a declutchable electric winder to which the winding pulley 702 is fixed and which thus replaces the nitrogen damper 704 and the transformation system 710. The folding mechanism then comprises, for each roller 254, a deflection pulley 520 fixed coaxially to the roller 254, a winding pulley 702, a winding cable 522, of which one end is fixed to the fixed structure 206 and of which the other end is fixed to the winding pulley 702 and in which the winding cable 522 passes through the deflection pulley 520, and a declutchable electric winder to which the winding pulley 702 is fixed. The declutching of the electric winder allows the deployment of the veil 252 when the deployment mechanism 500 is actuated.

The control unit or controller is connected to the various elements to activate them according to requirements. For example, the control unit controls the rotation in one direction or in another of each electric winder and of each actuator displacing the movable cowl 216.

Each veil 252 must have adequate structural characteristics to withstand the forces generated by the bypass stream 208 and be flexible enough to be able to fold. According to a particular embodiment, each veil 252 is composed of a flexible mesh structure onto which is fixed a flexible skin such as a fabric, for example.

The invention has been more particularly described in the case of a nacelle under a wing but it can be applied to a nacelle situated at the rear of the fuselage.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A turbofan engine having a longitudinal direction and comprising an engine and a nacelle surrounding the engine which comprises a fan casing, in which a path of a bypass air stream is delimited between the nacelle and the engine and in which an air stream circulates from front to rear of the turbofan engine, said nacelle comprising:
   a fixed structure fixed to the fan casing,
   a movable cowl which is movable in translation on the fixed structure in a direction of translation between an forward position, in which the movable cowl is positioned such that the movable cowl is close to the fan casing, and a rearward position, in which the movable cowl is positioned such that the movable cowl is away from the fan casing to define between them an open window between the flow path and the outside of the nacelle, a set of actuators ensuring a displacement of the movable cowl between the forward position and the rearward position, and vice versa, a plurality of flexible veils, each veil having a first edge either directly or indirectly attached to the movable cowl and a second edge opposite the first edge, in which said veil can alternately assume a folded position in which said veil is housed in the movable cowl or a deployed position in which said veil is extended between the first edge and the engine across the flow path, and a pneumatic system arranged to displace the second edge of each veil to displace said veil from the folded position to the deployed position and to displace the second edge of each veil to displace said veil from the deployed position to the folded position, in which the pneumatic system comprises:

a rigid main roll fixed inside the movable cowl to the rear of the window, for each veil, at least one extendable secondary roll secured to the main roll and in which the inside of each secondary roll is in fluidic continuity with the inside of the main roll, in which the second roll of said veil is fixed to each of said secondary rolls, and a pressurization and depressurization system which, alternately, generates a pressure in the main roll and, therefore, in each secondary roll, to inflate them in a transition from the forward position to the rearward position, or depressurizes the main roll and, therefore, in each secondary roll, to deflate them in the transition from the rearward position to the forward position.

2. The turbofan engine according to claim 1, wherein the pressurization and depressurization system comprises:

a Venturi-effect tube with an inlet section, an outlet section and an intermediate section between the inlet section and the outlet section, in which the inlet section is fluidically connected to an air take-off point in the flow path, a bypass line, of which an inlet is fluidically connected to the inlet section and of which an outlet is fluidically connected to the intermediate section, a terminal line, of which an inlet is fluidically connected to the bypass line and of which an outlet is fluidically connected to the main roll, a first valve disposed at the inlet of the bypass line and which can alternately assume an open position allowing a passage between the inlet section and the bypass line or a closed position preventing the passage between the inlet section and the bypass line, a second valve disposed at the inlet of the terminal line and which can alternately assume a first position allowing the passage between the bypass line and the terminal line from the inlet of the bypass line and preventing the passage between the terminal line and the bypass line to the outlet of the bypass line, and a second position allowing the passage between the terminal line and the bypass line to the outlet of the bypass line and preventing the passage between the bypass line and the terminal line from the inlet of the bypass line, and a third valve disposed at the outlet of the bypass line and which can alternately assume an open position allowing the passage between the bypass line and the outlet section or a closed position preventing the passage between the bypass line and the outlet section.

3. The turbofan engine according to claim 1, further comprising:

for each veil, a roller mounted to rotate freely on the movable cowl behind the window when the movable cowl is in the rearward position, in which the first edge of said veil is fixed to said roller, in which, in the folded position, said veil is wound around the roller, or in deployed position, said veil is unwound from the roller, a deployment mechanism arranged to displace the second edge of each veil to displace said veil from the folded position to the deployed position, and a folding mechanism arranged to drive each roller in rotation to displace the veil associated with said roller from the deployed position to the folded position.

4. The turbofan engine according to claim 3, wherein the deployment mechanism comprises:

for each second edge, a plate secured to the second edge, for each plate, at least one pulling pulley mounted to rotate freely on said plate, a cable which passes through each pulling pulley, and for each end of said cable, a declutchable displacement system which ensures the pulling of said end.

5. The turbofan engine according to claim 4, wherein there is a pulling pulley at each end of said plate.

6. The turbofan engine according to claim 4, wherein each displacement system comprises a set of guiding pulleys and an electric winder on which the cable is wound.

7. The turbofan engine according to claim 4, wherein the folding mechanism comprises, for each roller, a deflection pulley fixed coaxially to the roller, a winding pulley fixed to the fixed structure, a winding cable, of which one end is fixed to the fixed structure and of which another end is fixed to the winding pulley and in which the winding cable passes through the deflection pulley, a nitrogen damper, of which a cylinder is fixed to the fixed structure and of which a piston slides in the cylinder, and a transformation system which ensures a transformation of a rotational movement of the winding pulley into a translational movement of the piston and vice versa.

8. The turbofan engine according to claim 4, wherein the folding mechanism comprises, for each roller, a deflection pulley fixed coaxially to the roller, a winding pulley, a winding cable, of which one end is fixed to the fixed structure, and of which another end is fixed to the winding pulley and in which the winding cable passes through the deflection pulley, and a declutchable electric winder to which the winding pulley is fixed.

9. An aircraft comprising at least one turbofan engine according to claim 1.

10. A turbofan engine of claim 1, wherein each veil having the first edge fixed directly to the movable cowl.

* * * * *